United States Patent
Tanaka et al.

(10) Patent No.: US 9,854,129 B2
(45) Date of Patent: Dec. 26, 2017

(54) IMAGE PROCESSING APPARATUS, METHOD FOR CONTROLLING SAME, AND STORAGE MEDIUM FOR IMPROVING A PROCESSING EFFICIENCY IN AN IMAGE PROCESSING APPARATUS WHICH INCLUDES A MULTI-CORE PROCESSOR

(71) Applicant: Konica Minolta, Inc., Chiyoda-ku, Tokyo (JP)

(72) Inventors: Kazuto Tanaka, Ichikawa (JP); Minoru Yaguchi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 6 days.

(21) Appl. No.: 14/953,118

(22) Filed: Nov. 27, 2015

(65) Prior Publication Data
US 2016/0156807 A1    Jun. 2, 2016

(30) Foreign Application Priority Data

Nov. 28, 2014    (JP) .................................. 2014-241787

(51) Int. Cl.
H04N 1/32        (2006.01)
G06T 1/20        (2006.01)
H04N 1/00        (2006.01)

(52) U.S. Cl.
CPC .......... *H04N 1/32593* (2013.01); *G06T 1/20* (2013.01); *H04N 1/00347* (2013.01); *H04N 1/00973* (2013.01); *H04N 2201/0094* (2013.01)

(58) Field of Classification Search
None
See application file for complete search history.

(56) References Cited

U.S. PATENT DOCUMENTS

| 6,191,873 B1* | 2/2001 | Mizoguchi | H04N 1/4076 358/461 |
| 7,398,331 B2* | 7/2008 | Aoyama | G06F 11/1433 358/1.14 |
| 2008/0055677 A1* | 3/2008 | Minamino | G06T 7/90 358/514 |
| 2012/0284732 A1* | 11/2012 | Griglock | G06F 9/5066 718/104 |

FOREIGN PATENT DOCUMENTS

| JP | 2001-236302 | * | 8/2001 | ............. G06F 13/14 |
| JP | 2011-152685 A | | 8/2011 | |
| JP | 2014-096024 A | | 5/2014 | |
| JP | 2014-153931 | * | 8/2014 | ............... G06F 9/50 |

* cited by examiner

*Primary Examiner* — Mohammad Ghayour
*Assistant Examiner* — Pawandeep Dhingra
(74) *Attorney, Agent, or Firm* — Buchanan Ingersoll & Rooney PC

(57) ABSTRACT

A scheduler of an image processing apparatus allocates processing of control programs of the image processing apparatus to a plurality of cores when it is determined that a processor is mounted to a peripheral unit. The scheduler allocates a control program of the peripheral unit and a program related to a control program for the peripheral unit among the control programs of the image processing apparatus to at least one core among the plurality of cores and allocates remaining control programs among the control programs of the image processing apparatus to remaining cores among the plurality of cores when it is determined that a processor is not mounted to the peripheral unit.

18 Claims, 6 Drawing Sheets

IMAGE PROCESSING APPARATUS, METHOD FOR CONTROLLING SAME, AND STORAGE MEDIUM FOR IMPROVING A PROCESSING EFFICIENCY IN AN IMAGE PROCESSING APPARATUS WHICH INCLUDES A MULTI-CORE PROCESSOR

This application is based on Japanese Patent Application No. 2014-241787 filed with the Japan Patent Office on Nov. 28, 2014, the entire content of which is hereby incorporated by reference.

BACKGROUND OF THE INVENTION

Field of the Invention

The present disclosure relates to an image processing apparatus, a method for controlling the same, and a recording medium, and particularly to an image processing apparatus including a multi-core processor, a method for controlling the same, and a non-transitory recording medium storing a program executed in such image processing apparatus.

Description of the Related Art

In recent years, there exists an image processing apparatus including a multi-core processor. Controls for the multi-core processor include symmetric multi-processing (SMP), in which physical memories of a plurality of processors are shared and managed, and asymmetric multi-processing (AMP), in which roles of processors are determined respectively. Various techniques have been proposed as to the controls performed in a device including a multi-core processor.

For example, Japanese Laid-Open Patent Publication No. 2014-096024 discloses a control program for a multi-core processor including a plurality of cores. The control program includes a global scheduler which determines an operation core of a thread to be generated, and a local scheduler provided for each of the plurality of cores. The local scheduler schedules a thread allocated to its own core in accordance with priorities and allows the thread to be executed on the own core. Moreover, the global scheduler determines execution of a thread migration between the plurality of cores based on a predetermined scheduling policy, and excludes threads of the N numbers of threads with higher priorities among the threads allocated to the cores from a subject of the thread migration.

Moreover, Japanese Laid-Open Patent Publication No. 2011-152685 discloses a printer control device including a CPU having a plurality of MPU cores. This device allocates to the cores processes of executing respective programs of receiving processing, data analysis processing, image depiction processing, and video signal transmission processing, and executes the processes simultaneously in parallel by transmitting information between the processes through communication means in the FIFO form.

SUMMARY OF THE INVENTION

There is a case where an image processing apparatus including a multi-core processor changes allocation of tasks to cores in accordance with a condition of a peripheral unit to which the image processing apparatus is connected. For example, a case is assumed where the image processing apparatus controlled with the SMP described above is connected to a peripheral unit (for example, a scanner) and the peripheral unit detects that a processor is not mounted. In this case, the image processing apparatus distributes processing at each core while allocating at least one of a plurality of cores in the plurality of multi-core processors on the image processing apparatus to be used for controlling a scanner. In other words, when the processing by any of the cores becomes heavy, the image processing apparatus executes a control of shifting the processing to other core to maintain a processing efficiency as a system.

It should be noted that, while there is a well-known art of allowing each control task to be operated only on a designated core, it cannot be applied to a kernel of some OS (for example, Linux®). Therefore, when such art is applied to a device having the some OS, and use of a device drive or a scheduler, for example, increases processing which must be handled by the OS, processing of all the cores are expected to be heavy.

Moreover, among the control tasks executed by the image processing apparatus, some tasks may be more efficient when executed with a plurality of cores in parallel than when the core executing the task is fixed.

The present disclosure was made in view of such circumstances, and its object is to improve a processing efficiency in an image processing apparatus which includes a multi-core processor and is connected to a peripheral unit having no processor mounted.

In accordance with one aspect of the present disclosure, an image processing apparatus connected to a peripheral unit is provided. The image processing apparatus comprises a multi-core processor including a plurality of cores. The multi-core processor is configured to determine whether or not a processor is mounted to the peripheral unit. The multi-core processor is configured to allocate processing of control programs of the image processing apparatus to the plurality of cores when the determination unit determines that a processor is mounted to the peripheral unit. The multi-core processor is configured to allocate a control program for the peripheral unit and a program related to the control program of the peripheral unit among the control programs of the image processing apparatus to at least one core of the plurality of cores, and allocate remaining control programs among the control programs of the image processing apparatus to remaining cores among the plurality of cores when the determination unit determines that a processor is not mounted to the peripheral unit.

Preferably, a control program related to firmware of the peripheral unit is a program for executing processing related to a control of hardware of the peripheral unit.

Preferably, the multi-core processor is configured to allocate threads to remaining cores among the plurality of cores by symmetrical multi-processing when the determination determines that the processor is not mounted to the peripheral unit.

Preferably, the multi-core processor is configured to allocate threads to the plurality of cores by symmetrical multi-processing when the determination unit determines that a processor is mounted to the peripheral unit.

Preferably, the multi-core processor is configured to achieve allocation of a control program executed in a band unit among control programs of the image processing apparatus by asymmetrical multi-processing, and allocation of a control program executed in a page unit among control programs of the image processing apparatus by asymmetrical multi-processing.

In accordance with another aspect of the present disclosure, a method for controlling an image processing apparatus connected to a peripheral unit and including a multi-core processor having a plurality of cores is provided. The method comprises determining whether or not a processor is mounted to the peripheral unit, and allocating control programs of the image processing apparatus to the plurality of cores when it is determined that a processor is mounted to the peripheral unit. The allocating control programs of the image processing apparatus includes allocating a control program for the peripheral unit and a program related to the control program for the peripheral unit among the control programs of the image processing apparatus to at least one core among the plurality of cores when it is determined that the processor is not mounted to the peripheral unit, and allocating remaining control programs among the control programs of the image processing apparatus to remaining cores among the plurality of cores when it is determined that the processor is not mounted to the peripheral unit.

Preferably, a control program related to firmware of the peripheral unit is a program for executing processing related to a control of hardware of the peripheral unit.

Preferably, allocating remaining control programs among the control programs of the image processing apparatus to remaining cores of the plurality of cores includes allocating threads to remaining cores among the plurality of cores by symmetrical multi-processing.

Preferably, the allocating control programs of the image processing apparatus includes allocating threads to the plurality of cores by symmetrical multi-processing.

Preferably, the achieving allocation of a control program executed in a band unit among control programs of the image processing apparatus by asymmetrical multi-processing, and the achieving allocation of a control program executed in a page unit among control programs of the image processing apparatus by asymmetrical multi-processing are further included.

In accordance with yet another aspect of the present disclosure, a non-transitory computer-readable storage medium storing programs which are readable by a multi-core processor including a plurality of cores is provided. The multi-core processor is provided in an image processing apparatus connected to a peripheral unit. The program allows the multi-core processor to execute determining whether or not a processor is mounted to the peripheral unit, and allocating threads of control programs of the image processing apparatus to the plurality of cores when it is determined that a processor is mounted to the peripheral unit. The allocating control programs of the image processing apparatus includes allocating a control program for the peripheral unit and a program related to the control program for the peripheral unit among the control programs of the image processing apparatus to at least one core among the plurality of cores when it is determined that a processor is not mounted to the peripheral unit, and allocating remaining control programs among control programs of the image processing apparatuses to remaining cores among the plurality of cores when it is determined that a processor is not mounted to the peripheral unit.

Preferably, a control program related to firmware of the peripheral unit is a program for executing processing related to a control of hardware of the peripheral unit.

Preferably, allocating remaining control programs among control programs of the image processing apparatus to remaining cores of the plurality of cores includes allocating threads to remaining cores among the plurality of cores by symmetrical multi-processing.

Preferably, the allocating control programs of the image processing apparatus includes allocating threads to the plurality of cores by symmetrical multi-processing.

Preferably, the program allows the multi-core processor to further execute achieving allocation of a control program executed in a band unit among the control programs of the image processing apparatus by asymmetrical multi-processing, and achieving allocation of a control program executed in a page unit among the control programs of the image processing apparatus by asymmetrical multi-processing.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
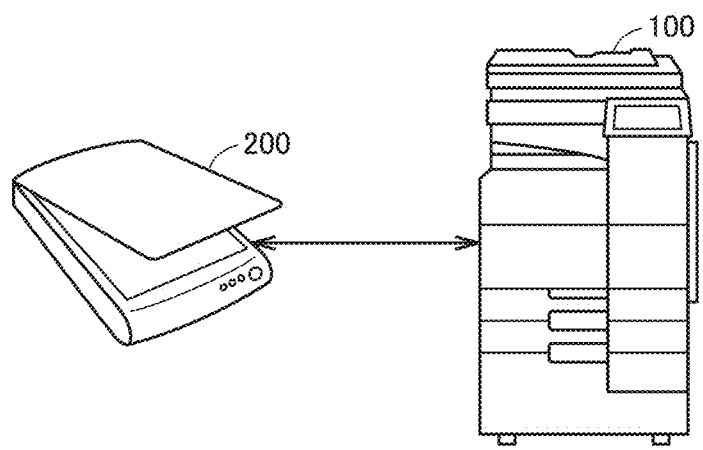
FIG. 1 schematically represents a configuration of an image processing system.

Hereinafter, an embodiment of an image processing system including an image processing apparatus will be described with reference to the drawings. In the following description, the same parts and components have the same reference numerals allotted. Names and functions of those are also the same. Thus, description thereof will not be repeated.

[Schematic Configuration of Image Processing System]

FIG. 1 schematically represents a configuration of the image processing system.

Referring to FIG. 1, the image processing system includes an MFP 100, which is one example of the image processing apparatus, and a scanner device 200 connected to MFP 100. Scanner device 200 is connected to MFP 100 through, for example, a serial interface (I/F).

In scanner device 200, when a processor is mounted, the processor executes firmware of scanner device 200. On the other hand, when the processor is not mounted to scanner device 200, a processor of MFP 100 executes firmware of scanner device 200. The firmware of scanner device 200 is one example of a control program for scanner device 200. In the present specification, the firmware of scanner device 200 is sometimes referred to as "scanner FW."

MFP 100 includes a multi-core processor. In MFP 100, when the processor is not mounted to scanner device 200, one core in the multi-core processor executes scanner FW. Moreover, in MFP 100, the core executing scanner FW further executes a control program related to scanner FW. The control program related to scanner FW is, for example, a scan control program which instructs scanning of a document to scanner device 200 (scanner unit 210) and compresses scan data outputted from scanner device 200. The scan control program is one example of a program for executing processing related to a control of hardware of scanner device 200.

[Functional Configuration of Controller]

Figure 2:
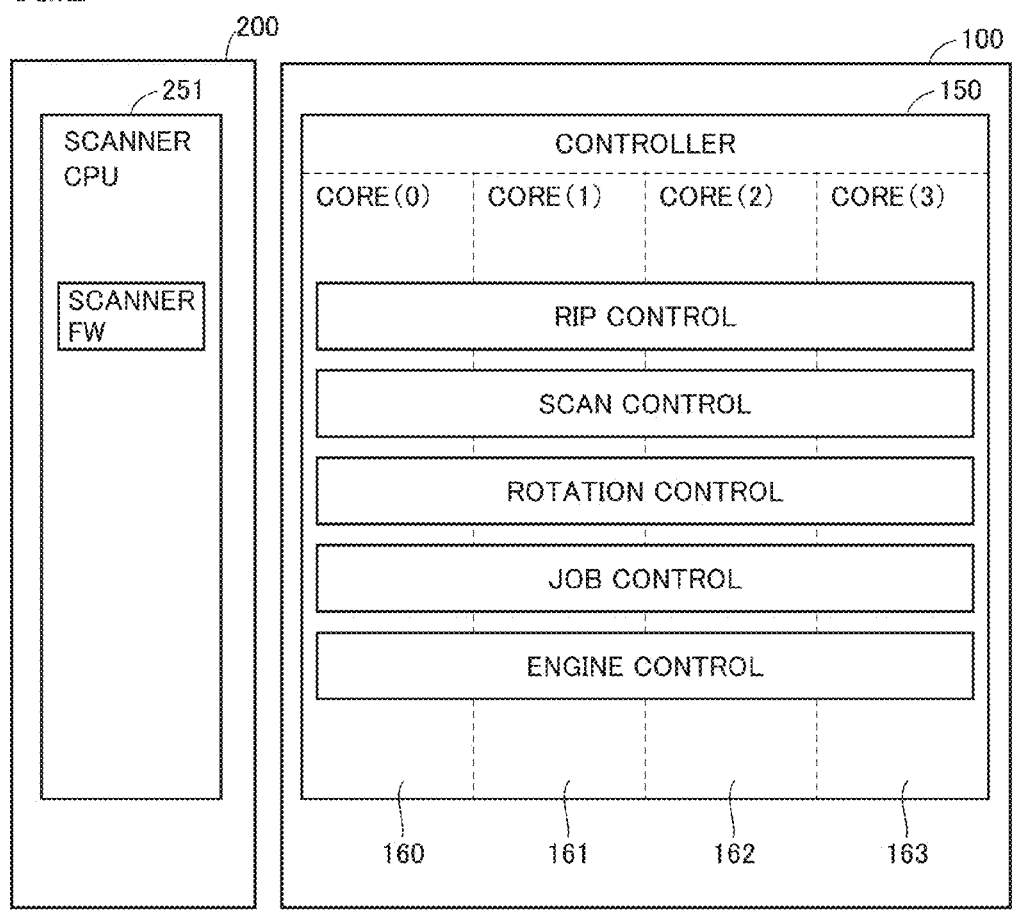
FIG. 2 schematically represents one example of a functional configuration of the image processing system where a scanner device includes a processor.

FIG. 2 schematically represents one example of a functional configuration in the image processing apparatus where scanner device 200 includes a processor.

In the example shown in FIG. 2, MFP 100 includes a controller 150 for integrally controlling MFP 100. Moreover, scanner device 200 includes, as a processor, a CPU (Central Processing Unit) 251 integrally controlling scanner device 200. CPU 251 executes scanner FW. Controller 150 executes control programs of MFP 100. The control programs of MFP 100 include an RIP (Raster Image Processor) control program, a scan control program, a rotation control program, a JOB control program, and an engine control program.

The RIP control program, for example, executes RIP processing for converting a PDL (Printer Description Language), which is print data, into raster data in a bit map form.

The scan control program, for example, compresses scan data outputted from scanner device 200 and outputs the same to the engine control program which will be described later.

The rotation control program executes processing of rotating image data.

The JOB control program integrally controls execution and management of processing of a job (such as a print job) received by MFP 100.

The engine control program controls operation of hardware to execute the job in MFP 100. For example, the engine control program expands the compressed data outputted from the scan control program described above to generate print data. Moreover, the engine control program controls processing for printing an image based on the print data onto a sheet.

Controller 150 includes four cores represented as a core (0) 160, a core (1) 161, a core (2) 162, and a core (3) 163. In the example shown in FIG. 2, the above-described RIP control program, scan control program, rotation control program, JOB control program, and engine control program are achieved at four cores by SMP.

It should be noted that, although it is described in FIG. 2 (and FIG. 3 which will be described later) that the control programs are evenly executed at the plurality of cores controlled by SMP, the plurality of cores are indeed controlled by SMP to be operated such that workloads for each are evenly distributed. Since a specific method for distributing the load by SMP can be employed from well-known arts, detailed description will not be repeated.

Figure 3:
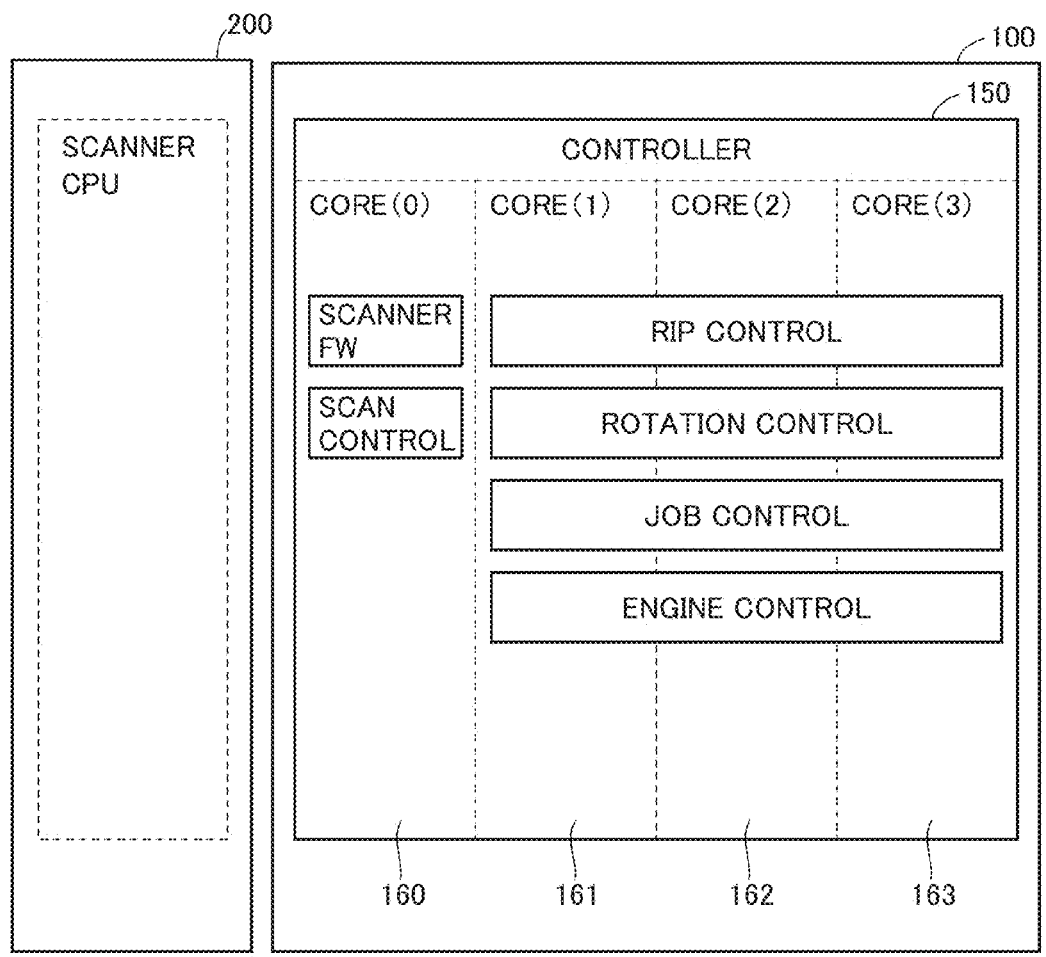
FIG. 3 schematically represents one example of a functional configuration of the image processing apparatus where a scanner device does not include a processor.

FIG. 3 schematically represents one example of a functional configuration in the image processing apparatus where scanner device 200 does not include a processor.

In the example shown in FIG. 3, at least one (core (0) 160) of the four cores in controller 150 of MFP 100 executes scanner FW. Moreover, core (0) 160 executes the scan control program which is one example of the program related to scanner FW. On the other hand, in controller 150, remaining control programs (the RIP control program, the rotation control program, the JOB control program, and the engine control program) are achieved by SMP.

In other words, in the example shown in FIG. 3, scanner FW and the scan control program are achieved by AMP at one core (core (0) 160) among the four cores in controller 150. The remaining control programs of MFP 100 are achieved by SMP at the remaining cores (core (1) 161, core (2) 162, and core (3) 163) of controller 150.

[Hardware Configuration (1) of Image Processing System]

Figure 4:
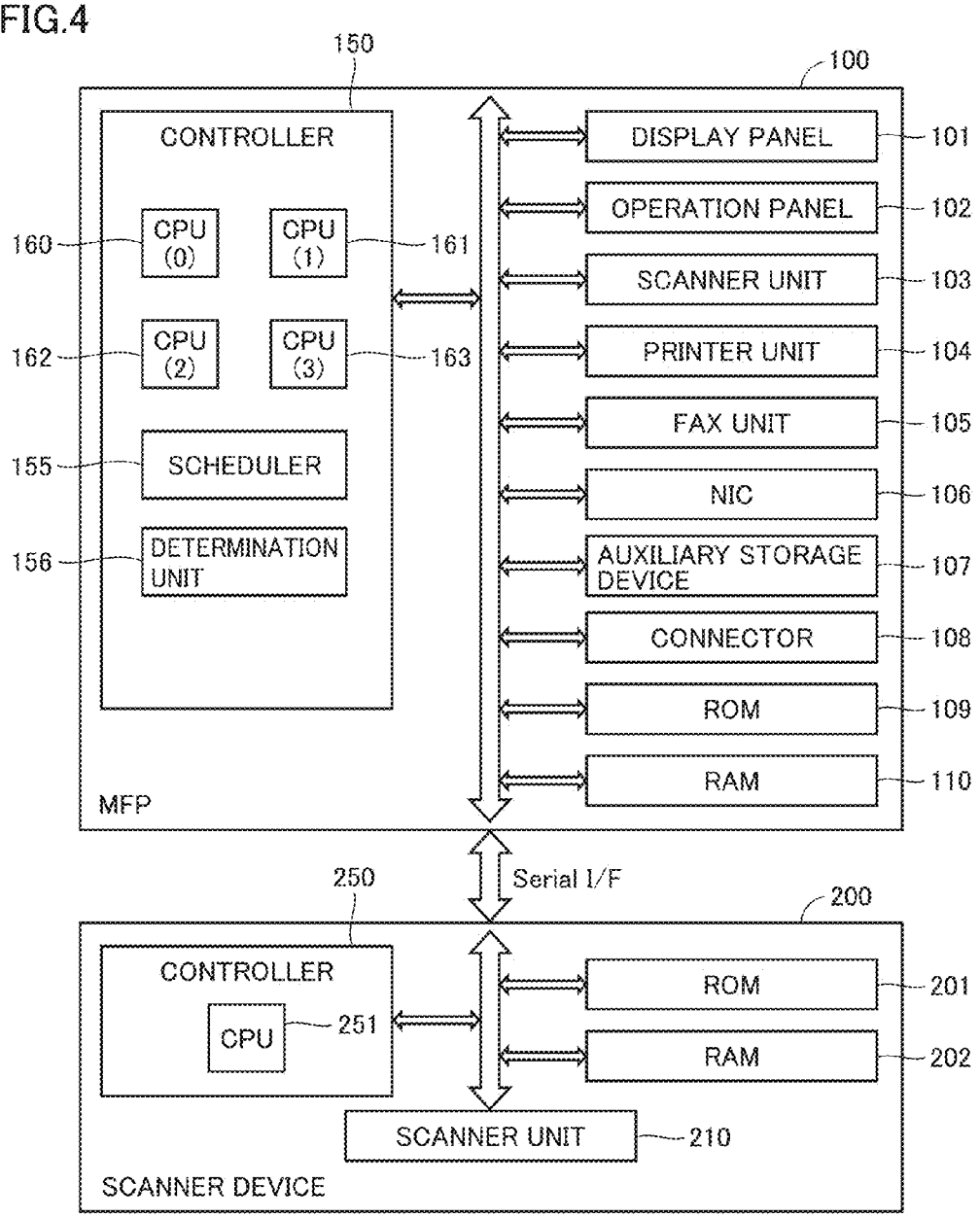
FIG. 4 represents one example of a hardware configuration of the image processing apparatus where a scanner device includes a processor.

FIG. 4 represents one example of a hardware configuration of the image processing system where scanner device 200 includes a processor. Hereinafter, respective hardware configurations of MFP 100 and scanner device 200 will be described.

(MFP 100)

As shown in FIG. 4, MFP 100 includes controller 150 as described above. Controller 150 is one example of the multi-core processor and, as described above, includes four cores (core (0) 160, core (1) 161, core (2) 162, and core (3) 163). Moreover, controller 150 includes a scheduler 155 and a determination unit 156. Scheduler 155 and determination unit 156 may be achieved by a predetermined program (for example, an operating system program) executed by the processor included in controller 150.

Scheduler 155 allocates processing to the four cores. Determination unit 156 determines whether the processor is mounted to the peripheral unit connected to MFP 100.

MFP 100 further includes a display panel 101, an operation panel 102, a scanner unit 103, a printer unit 104, a facsimile (FAX) unit 105, an NIC (Network Interface Card) 106, an auxiliary storage unit 107, a connector 108, an ROM 109, and an RAM 110.

Display panel 101 is constituted of, for example, a liquid crystal display device, and displays various information such as a state of MFP 100.

Operation panel 102 receives input of various kinds of information such as set values for a copy image quality or paper, information for registering or selecting a transmission destination (registration of destination) of scan, and the like. Operation panel 102 may be provided integrally with display panel 101 as a touch panel.

Scanner unit 103 scans a document set at scanner unit 103 and generates image data of the document. Since a method for generating image data in scanner unit 103 can be employed with a well-known method, detailed description thereof will not be repeated.

Printer unit 104 is a device for printing an image of image data read by scanner unit 103 or print data transmitted from external equipment such as scanner device 200, for example, by an electrophotographic method. Since the form of image forming such as the electrophotographic method can be employed with a well-known art, detailed description thereof will not be repeated.

FAX unit 105 achieves a transmission function of a facsimile communication.

NIC 106 is one example of an interface which is used when MFP 100 performs a communication through a network.

Auxiliary storage unit 107 stores various data of destination information registered in MFP 100, a document, or the like. The data of a document is inputted to MFP 100 from external equipment in some cases, or generated by reading an image at scanner unit 103 in some cases.

Auxiliary storage unit 107 may be a medium storing data in a non-volatile manner, for example, a CD-ROM (Compact Disc—Read Only Memory), a DVD-ROM (Digital Versatile Disk—Read Only Memory), a USB (Universal Serial Bus) memory, a memory card, an FD (Flexible Disk), a hard disk, an SSD (Solid State Drive), a magnetic tape, a cassette tape, an MO (Magnetic Optical Disc), an MD (Mini Disc), an IC (Integrated Circuit) card (except for a memory card), an optical card, a mask ROM, an EPROM, an EEPROM (Electronically Erasable Programmable Read- Only Memory), or the like. Moreover, there is a case where a program downloaded through the network is installed on auxiliary storage unit 107.

It should be noted that the program according to the present disclosure may invoke a module which is necessary, among program modules provided as a part of the operating system (OS) of a computer, in a predetermined arrangement at a predetermined timing and execute the same. In that case, the program itself does not include the module described above, and processing is executed in cooperation with the OS. A program which does not include such a module is also included in the program according to the present disclosure.

Moreover, the program according to the present disclosure may be incorporated into other part of the program and provided. Also in that case, the program itself does not include the module included in other program described above, and processing is executed in cooperation with other program. Such a program incorporated into other program is also included in the program according to the present disclosure.

The provided program product is installed in a program storage unit such as a hard disk and executed. It should be noted that the program product includes the program itself and a recording medium storing the program.

Connector 108 is a part for connecting MFP 100 to external equipment, and is, for example, an interface of a serial port of RS-232C standard. MFP 100 is connected to scanner device 200 through, for example, connector 108.

ROM 109 stores various data including programs executed by CPU 101.

RAM 110 serves as a working area at the time of execution of the programs in CPU 101. RAM 110 in some cases temporarily stores image data or the like read by scanner unit 103.

(Scanner Device 200)

As shown in FIG. 4, scanner device 200 includes a controller 250, an ROM 201, an RAM 202, and a scanner unit 210. Controller 250, ROM 201, RAM 202, and scanner unit 210 are connected to each other through an internal bus. Controller 250 includes a CPU 251 which is one example of a processor. CPU 251 integrally controls operation of scanner device 200.

Scanner unit 210 is controlled by CPU 251. More specifically, while being controlled by CPU 251, scanner unit 210 scans a document set at scanner unit 210 and generates image data of the document. The generated image data is transmitted to MFP 100, for example, by controller 250.

[Hardware Configuration (2) of Image Processing System]

Figure 5:
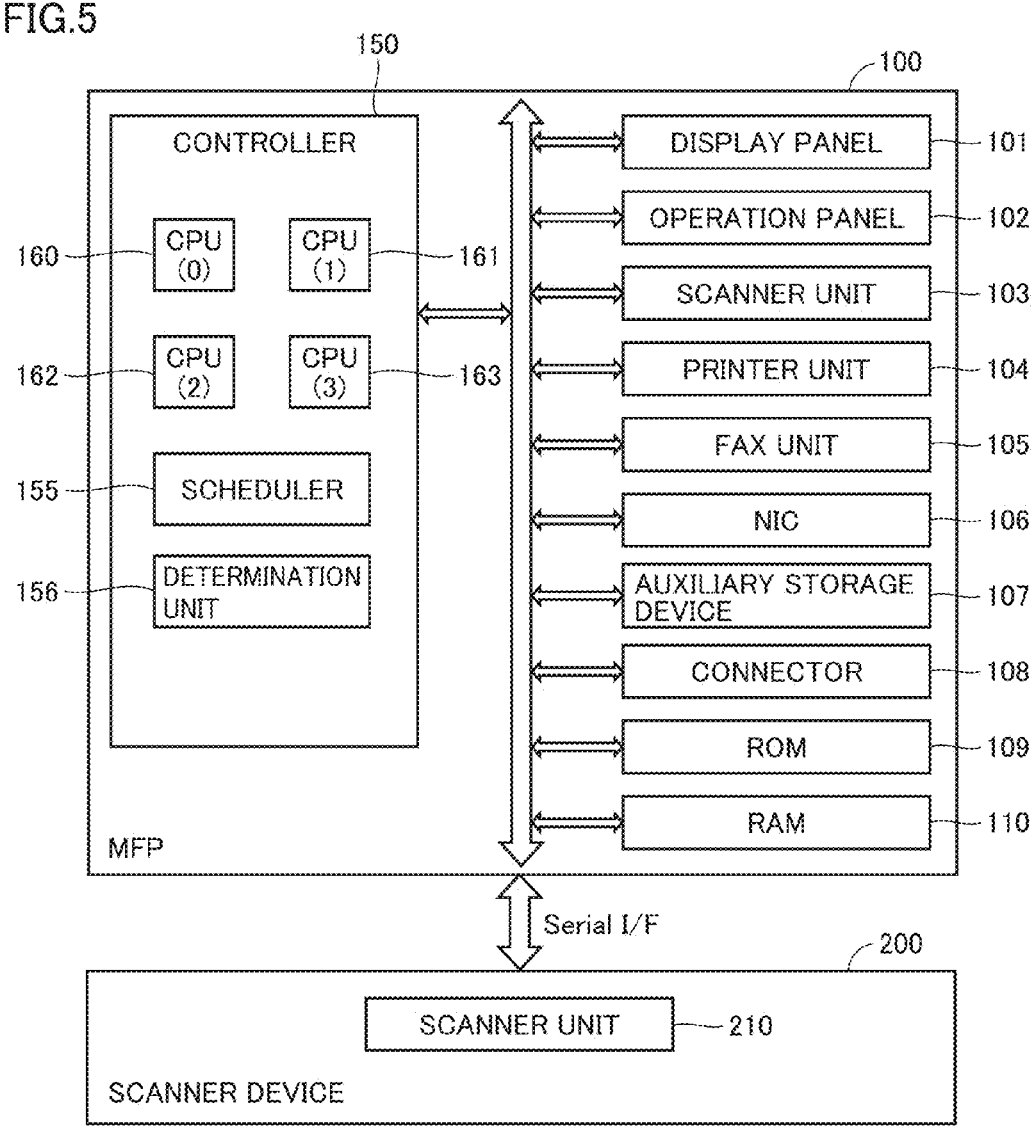
FIG. 5 represents one example of a hardware configuration of the image processing apparatus where a scanner device does not include a processer.

FIG. 5 represents one example of a hardware configuration of the image processing system where scanner device 200 does not include a processor.

In the image processing system shown in FIG. 5, the processor is not mounted to scanner device 200. The operation of scanner unit 210 of scanner device 200 is controlled by one core in controller 150.

[Flow of Processing]

Figure 6:
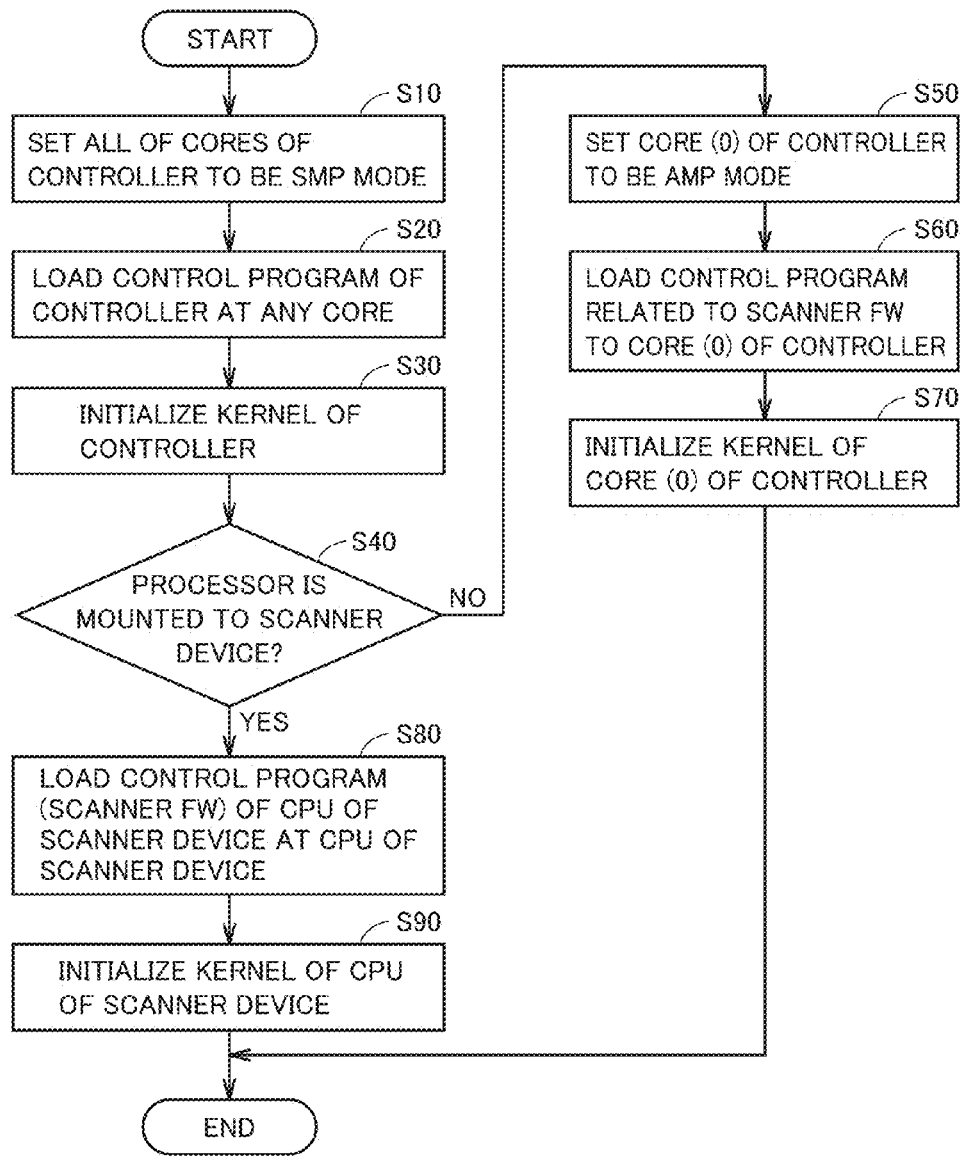
FIG. 6 is a flowchart representing processing executed when an operating system is started in an MFP (Multi-Functional Peripheral).

FIG. 6 is a flowchart representing processing executed when the operating system is started in MFP 100. The processing is executed, for example, by a plurality of cores in controller 150. In the following description, it is described such that a subject executing the processing of FIG. 6 is controller 150.

Referring to FIG. 6, in Step S10, controller 150 sets all of the cores (core (0) to core (3)) of controller 150 to be in an SMP mode. This setting is achieved by registering a value corresponding to the SMP mode, for example, to a portion storing set values of operation modes of the cores in auxiliary storage unit 107 or RAM 110. Each core of controller 150 is operated in the SMP mode or an AMP mode in accordance with the set value of the portion. Then, the control proceeds to Step S20.

In Step S20, controller 150 loads threads of the control programs (the RIP control program, the scan control program, the rotation control program, the JOB control program, the engine control program, and the like) of MFP 100 to any core among the four cores (core (0) to core (3)). It should be noted that the load of the threads is distributed such that the workload becomes equal (or the difference becomes minimum) to each other between the four cores. Then, the control proceeds to Step S30.

In Step S30, controller 150 initializes a kernel of controller 150. Then, the control proceeds to Step S40.

In Step S40, controller 150 determines whether the processor is mounted to scanner device 200 which is one example of the peripheral unit. More specifically, for example, when controller 150 transmits a command "start initial communication" with respect to the peripheral unit connected through connector 108 or the like, and a response to the command is given, controller 150 determines that a processor is mounted to the peripheral unit. On the other hand, when a response to the command is not given, controller 150 determines that a processor is not mounted to the peripheral unit.

Then, when controller 150 determines that a processor is mounted to the peripheral unit in Step S40 (YES in Step S40), the control proceeds to Step S80. On the other hand, when controller 150 determines that a processor is not mounted to the peripheral unit (NO in Step S40), the control proceeds to Step S50. In other words, in the processing of FIG. 6, the control proceeds to Step S80 when the image processing system has the configuration as shown in FIG. 2, and the control proceeds to Step S50 when the image processing system has the configuration as shown in FIG. 3.

In Step S50, controller 150 sets core (0) 160 to be in the AMP mode. Then, the control proceeds to Step S60.

In Step S60, controller 150 loads scanner FW and the scan control program, which is one example of the program related to scanner FW, to core (0) 160. Then, the control proceeds to Step S70.

It should be noted that, by the controls of Steps S50 and S60, controller 150 sets core (0) 160 to be in the AMP mode and sets core (1) 161 to core (3) 163 to be in the SMP mode, as shown in FIG. 3.

Returning to FIG. 6, in Step S70, controller 150 initializes the kernel of core (0) 160. Then, the processing of FIG. 6 is terminated.

On the other hand, in Step S80, controller 150 loads the control program (scanner FW) for the CPU (CPU 251 in FIG. 4) of scanner device 200 to CPU 251. Then, the control proceeds to Step S90.

In Step S90, controller 150 initializes the kernel of CPU 251 of scanner device 200 and terminates the processing of FIG. 6.

In the processing described with reference to FIG. 6 above, the control in Step S40 is achieved by determination unit 156. Moreover, the controls related to each core in controller 150 (Steps S10, S20, S50, S60) are achieved by scheduler 155.

In the present embodiment described above, when a processor is mounted to the peripheral unit connected to MFP 100, the plurality of cores in controller 150 are controlled in the SMP mode. On the other hand, when a processor is not mounted to the peripheral unit connected to MFP 100, at least one of the plurality of cores are controlled in the AMP mode in MFP 100 to execute the control program of the peripheral unit and the control program of MFP 100 related to the control program of the peripheral unit, and the remaining cores are controlled in the SMP mode to execute the control programs of MFP 100.

Accordingly, when a processor is not mounted to the peripheral unit, while allowing one core to intensively execute the control program of the peripheral unit and the control program of the MFP 100 related to the control program of the peripheral unit, the remaining control programs of MFP 100 can be executed efficiently in the SMP mode at other cores.

Here, the controls in the present embodiment will be described more specifically.

In the image processing system of the present embodiment, when a processor is not mounted to scanner device 200, and one of the four cores of controller 150 of MFP 100 is allocated for the control of scanner device 200 (scanner FW), the scan control task (scan control program) is also allocated to the same core. More specifically, the scan control task is prepared in a loadable manner, and the core for executing scanner FW is separated from other cores in the AMP mode, and thereafter scanner FW and the scan control task are loaded to the core for controlling the scanner (core (0) 160). Consequently, between the core for controlling the scanner and the core for executing firmware of MFP 100, a communication rate can be reduced, and information which must be shared can also be reduced.

In other words, as proceeding toward the lower layer of the control software, the number of communications increases. In the upper layer, for example, when the scan job is started, the communication with the granularity of completion of scan job is implemented between the core for controlling the scanner and the firmware of MFP 100. On the other hand, it can be considered that the communication with fine granularity occurs, such as from starting the first scan to the completion of the first scan in the subordinate layer, and from starting the band transfer to the completion of the band transfer in more subordinate layer.

On the other hand, as described above, separating the core for executing scanner FW from other cores in the AMP mode and thereafter loading scanner FW and the scan control task to the core for controlling the scanner (core (0) 160) can reduce the amount of information which must be shared between the core for controlling the scanner and the core for executing the firmware of MFP 100. For example, it is all necessary that information merely including a set value of a job and a buffer position after the processing (for example, a head position) is shared between the scan control program and the JOB control program.

Between scanner FW and the scan control program, more detailed set values, in other words, a set value of an HW set level, a buffer position for each page (band), and the like are shared.

Moreover, since scanner FW and the scan control are operated at the core for controlling the scanner, more performance of the allocated core (the core for controlling the scanner) is produced.

It should be noted that, among the control programs of MFP 100, at least one of those are preferably controlled in the AMP mode. For example, when the processing is executed in a band unit, the engine control program expanding compressed scan data outputs compressed data from the scan control program at a relatively high frequency. Therefore, when MFP 100 processes image data in a band unit, the engine control program is preferably executed by the core controlled in the AMP mode.

In other words, in such a case, threads of the engine control program are preferably executed by a single core. On the other hand, when MFP 100 processes image data in a page unit, the engine control program is preferably executed by the core controlled in the SMP mode in view of improvement in the process efficiency of entire MFP 100.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus connected to a peripheral unit, comprising:
   a multi-core processor including a plurality of cores,
   said multi-core processor configured to:
   determine whether or not a processor is mounted to said peripheral unit;
   allocate processing of a control program of said image processing apparatus to said plurality of cores when it is determined that a processor is mounted to said peripheral unit; and
   allocate a control program for said peripheral unit and a program related to said control program for said peripheral unit, among control programs of said image processing apparatus, to at least one core among said plurality of cores, and allocate remaining control programs among said control programs of said image processing apparatus to remaining cores among said plurality of cores when it is determined that a processor is not mounted to said peripheral unit.

2. The image processing apparatus according to claim 1, wherein said program related to said control program for said peripheral unit is firmware of said peripheral unit, and is configured for executing processing related to a control of hardware of said peripheral unit.

3. The image processing apparatus according to claim 1, wherein said multi-core processor is configured to allocate threads to remaining cores among said plurality of cores by symmetrical multi-processing when it is determined that a processor is not mounted to said peripheral unit.

4. The image processing apparatus according to claim 1, wherein said multi-core processor is configured to allocate threads to said plurality of cores by symmetrical multi-processing when it is determined that a processor is mounted to said peripheral unit.

5. The image processing apparatus according to claim 1, wherein said multi-core processor is configured to achieve allocation of a control program executed in a band unit, among control programs of said image processing apparatus, by asymmetrical multi-processing, and allocation of a control program executed in a page unit, among control programs of said image processing apparatus, by asymmetrical multi-processing.

6. The image processing apparatus according to claim 1, wherein said multi-core processor is configured to allocate threads to said at least one core among said plurality of cores by asymmetrical multi-processing when it is determined that a processor is not mounted to said peripheral unit.

7. A method for controlling an image processing apparatus connected to a peripheral unit and including a multi-core processor having a plurality of cores, the method comprising:
   determining whether or not a processor is mounted to said peripheral unit; and allocating control programs of said image processing apparatus to said plurality of cores when it is determined that a processor is mounted to said peripheral unit, said allocating control programs of said image processing apparatus including:

allocating a control program for said peripheral unit and a program related to the control program for the peripheral unit, among control programs of said image processing apparatus, to at least one core among said plurality of cores when it is determined that a processor is not mounted to said peripheral unit; and allocating remaining control programs among said control programs of said image processing apparatus to remaining cores among said plurality of cores when it is determined that a processor is not mounted to said peripheral unit.

8. The method according to claim 7, wherein said program related to the control program for said peripheral unit is firmware of said peripheral unit, and is configured for executing processing related to a control of hardware of said peripheral unit.

9. The method according to claim 7, wherein allocating remaining control programs among control programs of said image processing apparatus to remaining cores of said plurality of cores includes allocating threads to remaining cores among said plurality of cores by symmetrical multi-processing.

10. The method according to claim 7, wherein said allocating control programs of said image processing apparatus includes allocating threads to said plurality of cores by symmetrical multi-processing.

11. The method according to claim 7, further comprising:

achieving allocation of a control program executed in a band unit, among control programs of said image processing apparatus, by asymmetrical multi-processing; and achieving allocation of a control program executed in a page unit, among control programs of said image processing apparatus, by asymmetrical multi-processing.

12. The method according to claim 7, wherein allocating the control program for said peripheral unit and the program related to the control program for the peripheral unit, among said control programs of said image processing apparatus, includes allocating threads to said at least one core among said plurality of cores by asymmetrical multi-processing.

13. A non-transitory computer-readable storage medium storing programs which are readable by a multi-core processor including a plurality of cores, said multi-core processor being provided in an image processing apparatus connected to a peripheral unit, said program allowing said multi-core processor to execute:

determining whether or not a processor is mounted to said peripheral unit; and allocating threads of control programs of said image processing apparatus to said plurality of cores when it is determined that a processor is mounted to said peripheral unit, said allocating control programs of said image processing apparatus including:

allocating a control program for said peripheral unit and a program related to the control program for the peripheral unit, among control programs of said image processing apparatus, to at least one of cores among said plurality of cores when it is determined that a processor is not mounted to said peripheral unit; and allocating remaining control programs among control programs of said image processing apparatus to remaining cores among said plurality of cores when it is determined that a processor is not mounted to said peripheral unit.

14. The storage medium according to claim 13, wherein said program related to the control program for said peripheral unit is firmware of said peripheral unit, and is configured for executing processing related to a control of hardware of said peripheral unit.

15. The storage medium according to claim 13, wherein allocating remaining control programs among control programs of said image processing apparatus to remaining cores of the plurality of cores includes allocating threads to remaining cores among said plurality of cores by symmetrical multi-processing.

16. The storage medium according to claim 13, wherein said allocating control programs of said image processing apparatus includes allocating threads to said plurality of cores by symmetrical multi-processing.

17. The storage medium according to claim 13, wherein said program allows said multi-core processor to further execute:

achieving allocation of a control program executed in a band unit, among control programs of said image processing apparatus, by asymmetrical multi-processing; and achieving allocation of a control program executed in a page unit, among control programs of said image processing apparatus, by asymmetrical multi-processing.

18. The storage medium according to claim 13, wherein allocating the control program for said peripheral unit and the program related to the control program for the peripheral unit, among said control programs of said image processing apparatus, includes allocating threads to said at least one core among said plurality of cores by asymmetrical multi-processing.

* * * * *